United States Patent
Koning et al.

(10) Patent No.: US 7,627,650 B2
(45) Date of Patent: Dec. 1, 2009

(54) SHORT-CUT RESPONSE FOR DISTRIBUTED SERVICES

(75) Inventors: G. Paul Koning, Brookline, NH (US); Peter C. Hayden, Mount Vernon, NH (US); Paula Long, Hollis, NH (US); Kirtley C. Gillum, Hudson, NH (US); Daniel E. Suman, Westford, MA (US)

(73) Assignee: EqualLogic, Inc., Nashua, NH (US)

( * ) Notice: Subject to any disclaimer, the term of this patent is extended or adjusted under 35 U.S.C. 154(b) by 555 days.

(21) Appl. No.: 10/347,901

(22) Filed: Jan. 20, 2003

(65) Prior Publication Data
US 2004/0143648 A1 Jul. 22, 2004

(51) Int. Cl.
*G06F 15/173* (2006.01)

(52) U.S. Cl. .................. 709/219; 709/223; 709/224; 709/228; 709/238; 709/229; 709/227; 709/240; 709/225; 709/226; 370/254; 370/357; 726/3; 726/4; 726/9; 726/14

(58) Field of Classification Search .................. 709/203, 709/225, 217, 219, 192, 226–228, 238, 223, 709/224; 710/18, 19; 718/104, 105; 370/352, 370/401; 713/201; 707/10
See application file for complete search history.

(56) References Cited

U.S. PATENT DOCUMENTS

| | | |
|---|---|---|
| 5,392,244 A | 2/1995 | Jacobson et al. |
| 5,774,660 A | 6/1998 | Brendel et al. |
| 5,774,668 A | 6/1998 | Choquier et al. |
| 5,978,844 A | 11/1999 | Tsuchiya et al. |
| 6,070,191 A | 5/2000 | Narendran et al. |
| 6,108,727 A | 8/2000 | Boals et al. |
| 6,122,681 A | 9/2000 | Aditya et al. |

(Continued)

FOREIGN PATENT DOCUMENTS

WO     WO 99/53415 A     10/1999

(Continued)

OTHER PUBLICATIONS

Scheuermann P et al: "Data Partitioning And Load Balancing In Parallel Disk Systems" Techn. Rpt. A/02/96 University Of Saarland. pp. 1-48.

(Continued)

*Primary Examiner*—Jude J Jean Gilles
(74) *Attorney, Agent, or Firm*—Hamilton, Brook, Smith & Reynolds, P.C.

(57) ABSTRACT

The systems and methods described herein include methods for providing resources over a data network. The methods may be embodied as processes operating on a computer server, wherein that server comprises a plurality of server platforms, each of which are truly equivalent in that each provides a functionally equivalent interface to a client. In one practice of the invention, a method responds to client requests by detecting a request from a client for access to a resource and by establishing a connection for communicating with the client. The method then identifies a server available for servicing the detected request, and determines whether state information is associated with the connection. The method then, grants the identified server with access to the state information and allows the identified server to create and transmit a response to the client, also allowing the identified server to update the state information.

11 Claims, 6 Drawing Sheets

U.S. PATENT DOCUMENTS

| | | | |
|---|---|---|---|
| 6,128,279 | A | 10/2000 | O'Neil et al. |
| 6,141,688 | A | 10/2000 | Bi et al. |
| 6,144,848 | A | 11/2000 | Walsh et al. |
| 6,148,414 | A | 11/2000 | Brown et al. |
| 6,189,079 | B1 | 2/2001 | Micka et al. |
| 6,195,682 | B1 * | 2/2001 | Ho et al. .................... 709/203 |
| 6,199,112 | B1 | 3/2001 | Wilson |
| 6,212,565 | B1 | 4/2001 | Gupta |
| 6,212,606 | B1 | 4/2001 | Dimitroff |
| 6,226,684 | B1 | 5/2001 | Sung et al. |
| 6,292,181 | B1 | 9/2001 | Banjerjee et al. |
| 6,341,311 | B1 | 1/2002 | Smith et al. |
| 6,360,262 | B1 | 3/2002 | Guenthner et al. |
| 6,421,723 | B1 | 7/2002 | Tawil |
| 6,434,683 | B1 | 8/2002 | West et al. |
| 6,460,083 | B1 * | 10/2002 | Niwa et al. ................ 709/227 |
| 6,473,791 | B1 | 10/2002 | Al-Ghosein et al. |
| 6,498,791 | B2 | 12/2002 | Pickett et al. |
| 6,598,134 | B2 | 7/2003 | Ofek et al. |
| 6,687,731 | B1 | 2/2004 | Kavak |
| 6,725,253 | B1 | 4/2004 | Okano et al. |
| 6,732,171 | B2 | 5/2004 | Hayden |
| 6,742,059 | B1 * | 5/2004 | Todd et al. .................... 710/19 |
| 6,766,348 | B1 | 7/2004 | Combs et al. |
| 6,813,635 | B1 * | 11/2004 | Jorgenson .................... 709/225 |
| 6,850,982 | B1 * | 2/2005 | Siegel ........................ 709/227 |
| 6,859,834 | B1 | 2/2005 | Arora et al. |
| 6,886,035 | B2 * | 4/2005 | Wolff ........................ 709/219 |
| 6,910,150 | B2 | 6/2005 | Mashayekhi et al. |
| 6,944,777 | B1 | 9/2005 | Belani et al. |
| 6,950,848 | B1 | 9/2005 | Yousefi'zadeh |
| 6,957,433 | B2 | 10/2005 | Umberger et al. |
| 6,985,956 | B2 | 1/2006 | Luke et al. |
| 7,043,564 | B1 | 5/2006 | Cook et al. |
| 7,076,555 | B1 * | 7/2006 | Orman et al. ............... 709/227 |
| 7,085,829 | B2 | 8/2006 | Wu et al. |
| 7,089,293 | B2 | 8/2006 | Grosner et al. |
| 7,127,577 | B2 | 10/2006 | Koning et al. |
| 2001/0039581 | A1 | 11/2001 | Deng et al. |
| 2002/0008693 | A1 | 1/2002 | Banerjee et al. |
| 2002/0009079 | A1 | 1/2002 | Jungck et al. |
| 2002/0010783 | A1 * | 1/2002 | Primak et al. ............... 709/228 |
| 2002/0035667 | A1 | 3/2002 | Brunning |
| 2002/0059451 | A1 | 5/2002 | Haviv |
| 2002/0065799 | A1 | 5/2002 | West et al. |
| 2002/0138551 | A1 * | 9/2002 | Erickson .................... 709/203 |
| 2002/0194324 | A1 | 12/2002 | Guha |
| 2003/0005119 | A1 | 1/2003 | Mercier et al. |
| 2003/0074596 | A1 | 4/2003 | Mashayekhi et al. |
| 2003/0117954 | A1 | 6/2003 | De Neve et al. |
| 2003/0225884 | A1 | 12/2003 | Hayden |
| 2004/0030755 | A1 | 2/2004 | Koning et al. |
| 2004/0044771 | A1 * | 3/2004 | Allred et al. ................ 709/227 |
| 2004/0049564 | A1 | 3/2004 | Ng et al. |
| 2004/0080558 | A1 | 4/2004 | Blumenau et al. |
| 2004/0083345 | A1 | 4/2004 | Kim et al. |
| 2004/0103104 | A1 | 5/2004 | Hara et al. |
| 2004/0128442 | A1 | 7/2004 | Hinshaw et al. |
| 2004/0143637 | A1 | 7/2004 | Koning et al. |
| 2004/0153606 | A1 | 8/2004 | Schott |
| 2004/0210724 | A1 | 10/2004 | Koning et al. |
| 2004/0215792 | A1 | 10/2004 | Koning et al. |
| 2005/0010618 | A1 | 1/2005 | Hayden |
| 2005/0144199 | A2 | 6/2005 | Hayden |
| 2007/0106857 | A1 | 5/2007 | Koning et al. |

FOREIGN PATENT DOCUMENTS

| | | |
|---|---|---|
| WO | WO 01/38983 | 5/2001 |
| WO | WO 02/37943 | 5/2002 |
| WO | WO 02/44885 | 6/2002 |
| WO | WO 02/056182 | 7/2002 |

OTHER PUBLICATIONS

Wei Lui et al: "Design of an I/O balancing file system on web server clusters" Parallel Processing 2000 Intern. Workshops On Aug. 21-24, 2000, Piscataway, NJ, USA, IEEE, Aug. 21, 2000, pp. 119-125.

Anderson T E et al: "Serverless Network File Systems" ACM Transactions On Computer Systems, Assoc. For Computing Machinery, New York, US, vol. 14, No. 1, pp. 41-79, Feb. 1, 1996.

Hac A et al: IEEE: "Dynamic load balancing in a distributed system using a decentralized algorithm" Int. Conf. On Distributed Computing Systems, West Berlin, Sep. 21, 1987. Conf. Proceedings vol. 7, pp. 170-177.

Hartman J H et al: "The Zebra Striped Network File System" Operating Review (SIGOPS), ACM Headquarter New York, US vol. 27, No. 5, Dec. 1, 1993, pp. 29-43.

U.S. Appl. No. 60/411,743, filed Sep. 2002, Hinshaw et al.

Office Action dated Feb. 15, 2006 in U.S. Appl. No. 10/217,118, and subsequent reply.

Office Action dated Aug. 10, 2006 in U.S. Appl. No. 10/217,118, and subsequent reply.

Office Action dated Apr. 10, 2007 in U.S. Appl. No. 10/217,118, and subsequent reply.

Office Action dated Mar. 10, 2006 in U.S. Appl. No. 10/762,984, and subsequent reply.

Office Action dated Aug. 18, 2006 in U.S. Appl. No. 10/762,984, and subsequent reply.

Office Action dated Mar. 21, 2007 in U.S. Appl. No. 10/762,984, and subsequent pre-appeal brief.

Office Action dated May 31, 2006 in U.S. Appl. No. 10/347,898, and subsequent reply.

Office Action dated Oct. 16, 2006 in U.S. Appl. No. 10/347,898, and subsequent reply.

Office Action dated Mar. 14, 2006 in U.S. Appl. No. 10/761,884, and subsequent reply.

Office Action dated Oct. 20, 2006 in U.S. Appl. No. 10/761,884, and subsequent reply.

Office Action dated May 22, 2007 in U.S. Appl. No. 10/761,884, and subsequent reply.

Office Action dated Feb. 20, 2007 in U.S. Appl. No. 10/76,985, and subsequent reply.

Office Action dated Aug. 9, 2007 in U.S. Appl. No. 10/76,985, and subsequent reply.

Baltazar, H. And Garcia, A. Build Your Own SAN (2002).

Druschel, P., Rice University and Rowstron, A., Microsoft Reseach, Cambridge, UK. PAST: A large-scale, persistent peer-to-peer storage utility.

Ottem, E. Getting the Most From Your Storage: How to Deploy a SAN. Gadzoox Networks, Inc. (1999).

Networking with Pyramix.

Storage Area Networking (SAN)—The Veritas Strategy. Q Associates (2000).

Rapaport, L. And Baltazar, H. Introduction to SANs: Technology, Benefits, and Applications. (Jul. 9, 2001).

Enlist Desktops to Mirror Data. TechTarget (2002).

* cited by examiner

SHORT-CUT RESPONSE FOR DISTRIBUTED SERVICES

FIELD OF THE INVENTION

This invention relates to systems and methods for responding to requests made across a data network for data and services, and more particularly to systems and methods that more efficiently address requests from a client for access to data or services.

BACKGROUND OF THE INVENTION

As companies rely more and more on e-commerce, online transaction processing, and databases, the amount of information that needs to be managed and stored can intimidate even the most seasoned of network managers.

While servers do a good job of storing data, their capacity is limited, and they can become a bottleneck if too many users try to access the same information. Instead, most companies rely on peripheral storage devices such as tape libraries, RAID disks, and even optical storage systems. These storage devices are effective for backing up data online and storing large amounts of information. By hanging a number of such devices off of a server, a network administrator can create a server farm that can store a substantial amount of data for the enterprise.

But as server farms increase in size, and as companies rely more heavily on data-intensive applications such as multimedia, this traditional storage model is not quite as useful. This is because access to these peripheral devices can be slow, and it might not always be possible for every user to easily and transparently access each storage device.

Recently, a number of vendors have been developing Storage Area Network (SAN). SANs provide more options for network storage, including much faster access than the peripheral devices that operate as Network Attached Storage (NAS) and SANs further provide flexibility to create separate networks to handle large volumes of data.

A SAN is a high-speed special-purpose network or subnetwork that interconnects different kinds of data storage devices with associated data servers on behalf of a larger network of users. Typically, a storage area network is part of the overall network of computing resources for an enterprise. A SAN is usually clustered in close proximity to other computing resources such as IBM S/390 mainframes but may also extend to remote locations for backup and archival storage, using wide area network carrier technologies such as ATM or Synchronous Optical Networks. A SAN can use existing communication technology such as optical fiber ESCON or Fibre Channel technology.

SANs support disk mirroring, backup, restore, archival, and retrieval of archived data, data migration from one storage device to another, and the sharing of data among different servers in a network. SANs can incorporate subnetworks with network-attached storage systems.

Although SANs hold much promise, they face a significant challenge. Bluntly, consumers expect a lot of their data storage systems. Specifically, consumers demand that SANs provide network type scalability, service, and flexibility, while at the same time providing data access at speeds that compete with server farms. This can be quite a challenge, particularly in multi-server environments. In these environments, a client wishing to access specific information or a specific file is redirected to a server that has the piece of the requested information or file. The client then establishes a new connection to the other server upon redirect and severs the connection to the originally contacted server. However, this approach defeats the benefit of maintaining a long-lived connection between the client and the initial server.

Another approach is "storage virtualization" where an intermediary device is placed between the client and the servers, with the intermediary device providing the request routing. None of the servers is hereby aware that it is providing only a portion of the entire partitioned service. Adding the intermediary device adds complexity to the system.

It would therefore be desirable to provide a method and system that allows a client to contact any server in a multi-server environment and to access resources distributed with a reduced reliance on an intermediary device or server.

SUMMARY OF THE INVENTION

Other objects of the invention will, in part, be obvious, and, in part, be shown from the following description of the systems and methods shown herein.

The systems and methods described herein include methods for providing resources over a data network. The methods may be embodied as processes operating on a computer server, wherein that server comprises a plurality of server platforms, each of which is truly equivalent in that each provides a functionally equivalent interface to a client. In one practice of the invention, a method responds to client requests by detecting a request from a client for access to a resource and by establishing a connection for communicating with the client. The method then identifies a server available for servicing the detected request, and determines whether state information is associated with the connection. The method then, grants the identified server with access to the state information and allows the identified server to create and transmit a response to the client, also allowing the identified server to update the state information.

BRIEF DESCRIPTION OF THE DRAWINGS

The foregoing and other objects and advantages of the invention will be appreciated more fully from the following further description thereof, with reference to the accompanying drawings wherein.

DESCRIPTION OF THE ILLUSTRATED EMBODIMENTS

To provide an overall understanding of the invention, certain illustrative embodiments will now be described, including a system that provides a storage area network that more efficiently responds to requests from clients. However, it will be understood by one of ordinary skill in the art that the systems and methods described herein can be adapted and modified for other applications, such as distributed file systems, database applications and other applications where resources are partitioned or distributed. Moreover, such other additions and modifications fall within the scope hereof will not and do not depart from the scope of the invention.

Figure 1:
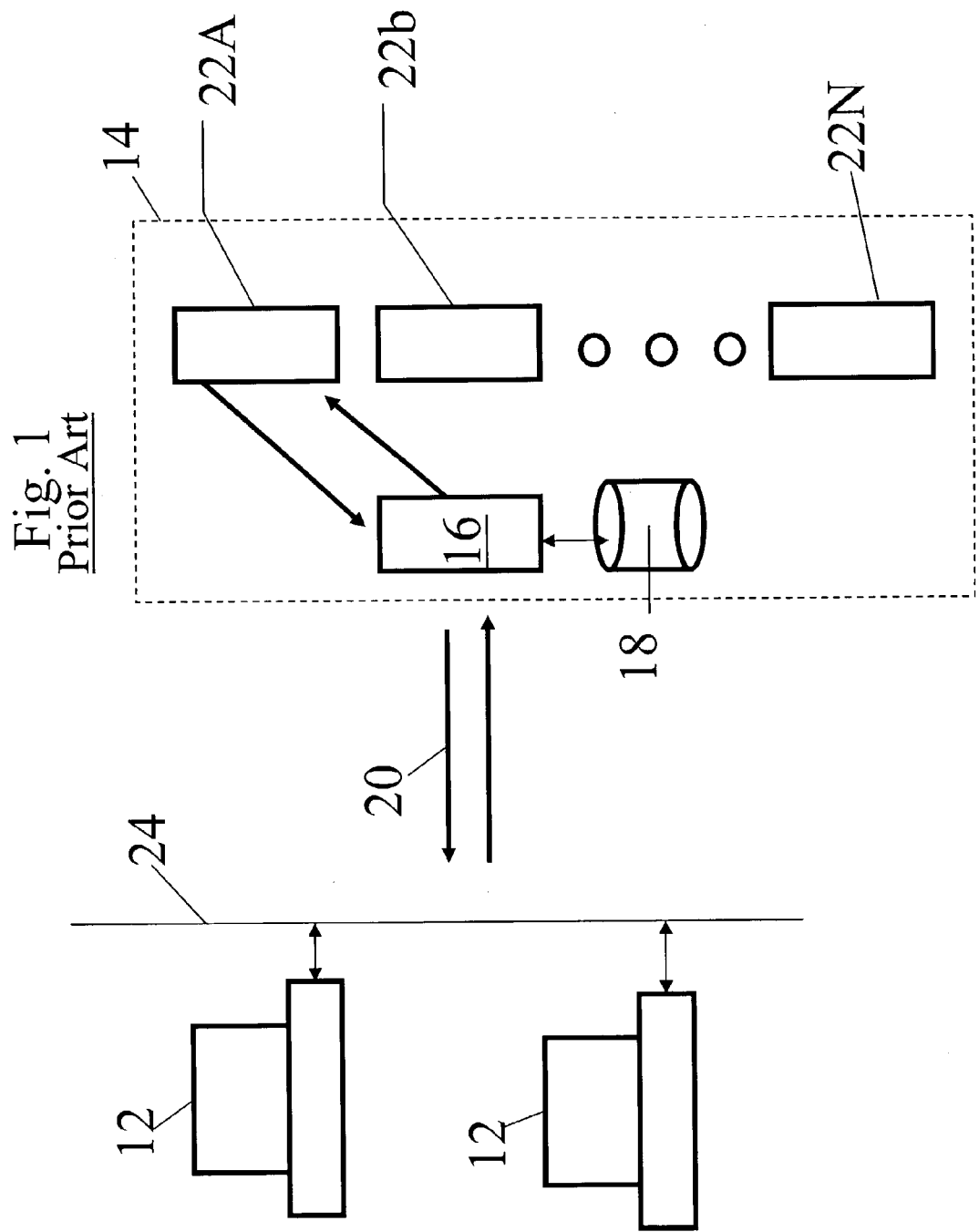
FIG. 1 depicts schematically the structure of a prior art system for providing access to a resource maintained on a storage area network.

FIG. 1 depicts a prior art network system for supporting requests for resources from a plurality of clients 12 that are communicating across a local area network 24. Specifically, FIG. 1 depicts a plurality of clients 12, a local area network (LAN) 24, and a storage system 14 that includes a switch 16, a master data table 18, and a plurality of servers 22a-22n. The storage system 14 may provide a storage area network (SAN) that provides storage resources to the clients 12 operating across the LAN 24. As further shown in FIG. 1 each client 12 may make a request for a resource maintained on the storage system/SAN 14. Each request is delivered to the switch 16 and processed therein. During processing is that the clients 12 can request resources across the LAN 24 and during processing, the switch 16 employs the master data table 18 to identify which of the plurality of servers 22A through 22N has the resource being requested by the respective client 12.

In FIG. 1, the master data table 18 is depicted as a database system, however in alternative embodiments the switch 16 may employ a flat file master data table that it maintained by the switch 16. In either case, the switch 16 employs the master data table 18 to determine which of the servers 22A through 22N maintains which resources. Accordingly, the master data table 18 acts as an index that lists the different resources maintained by the storage system 14 and which of the underlying servers 22A through 22N is responsible for which of the resources.

Although a LAN is described, those skilled in the art will realize that networks other than a LAN can be used, such as a metropolitan area network (MAN), an wide area network (WAN), a campus network, or a network of networks, such as the Internet. Accordingly, the invention is not limited to any particular type of network.

As further depicted by FIG. 1, once the switch 16 determines the appropriate server 22A through 22N for the requested resource, the retrieved resource may be passed from the identified server through the switch 16 and back to the LAN 24 for delivery to the appropriate client 12. Accordingly, FIG. 1 depicts storage system 14 employing the switch 16 as a central gateway through which all requests from the LAN 24 are processed. The consequence of this central gateway architecture is that delivery time of resources requested by clients 12 from storage system 14 can be relatively long and this delivery time may increase as latency periods grow due to increased demand for resources maintained by storage system 14.

Figure 2:
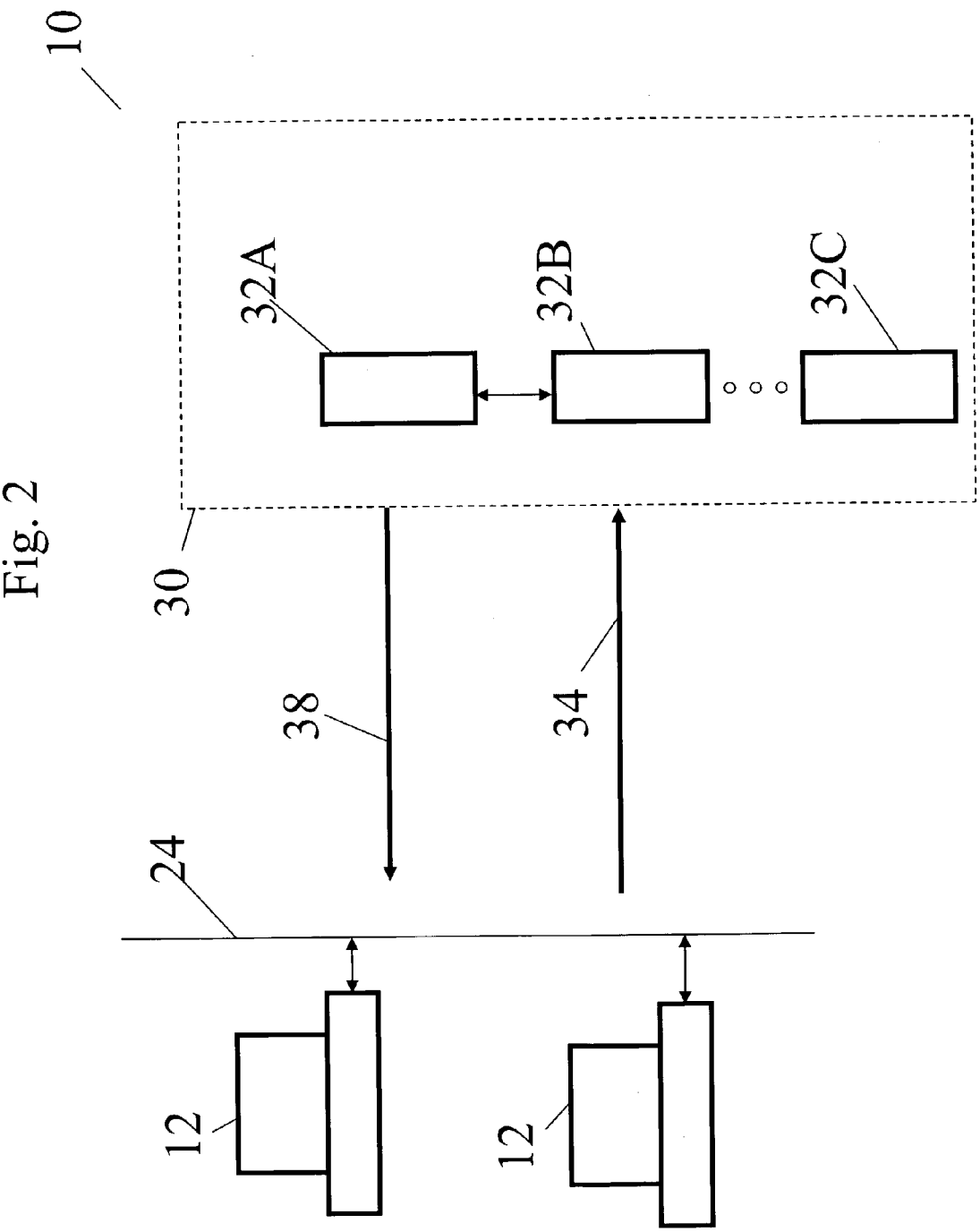
FIG. 2 presents a function block diagram of one system according to the invention.

Turning to FIG. 2, a system 10 according to the invention is depicted. Specifically, FIG. 2 depicts a plurality of clients 12, a local area network (LAN) 24, and a server group 30 that includes plurality of servers 32A through 32N. As shown by FIG. 2, the clients 12 communicate across the LAN 24. As further shown in FIG. 2, each client 12 may make a request for a resource maintained by the server group 30. In one application, the server group 30 is a storage area network (SAN) that provides network storage resources for clients 12 communicated across the network 24. Accordingly, a client 12 may make a request across the LAN 24 that is transmitted, as depicted in FIG. 2 as request 34, to a server such as the depicted server 32B.

Server group 30, configured as a storage area network, may comprise a plurality of equivalent servers 32A through 32N. Each of these servers has a separate IP address and thus the server group 30 appears as a SAN that includes a plurality of different IP addresses, each of which may be employed by the clients 12 for accessing storage resources maintained by the SAN. Furthermore, the depicted server group/SAN 30 may employ the plurality of servers 32A though 32N to partition resources across the storage area network. Thus, each of the individual servers may be responsible for a portion of the resources maintained by the server group/SAN 30.

In operation, the client request 34 received by the server 32B is processed by the server 32B to determine the resource of interest to that client 12 and to determine which of the plurality of servers 32A through 32N is responsible for that particular resource. In the example depicted in FIG. 2, the storage area network 30 determines that the server 32A is responsible for the resource identified in the client request 34. As further shown by FIG. 2, the storage area network 30 employs a system where, rather than have the original server 32B respond to the client request 34, the storage area network 30 employs a shortcut response that allows the responsible server, server 32A, to respond directly to the requesting client 12 by having the responsible server 32A deliver a response 38 that can be routed over the LAN 24 to the requesting client 12.

As discussed above, the storage area network 30 depicted in FIG. 2 comprises a plurality of equivalent servers. Equivalent servers will be understood, although not limited to, server systems that expose a uniform interface to clients 12: each equivalent server will respond in the same manner to a request presented by the client 12. Thus, each server 32A through 32N presents the same response to a client 12 and therefore it is immaterial to the client 12 which of the servers 32A through 32N responds to its request. Each of the depicted servers 32A through 32N may comprise conventional computer hardware platforms such as one of the commercially available server systems from Sun Microsystems, Inc. of Santa Clara, Calif. Each server executes one or more software processes for the purpose of implementing the storage area network. The server group 30 may include a Fibre Channel network system, an arbitrated loop, or any other type of network system suitable for providing a storage area network.

Figure 3:
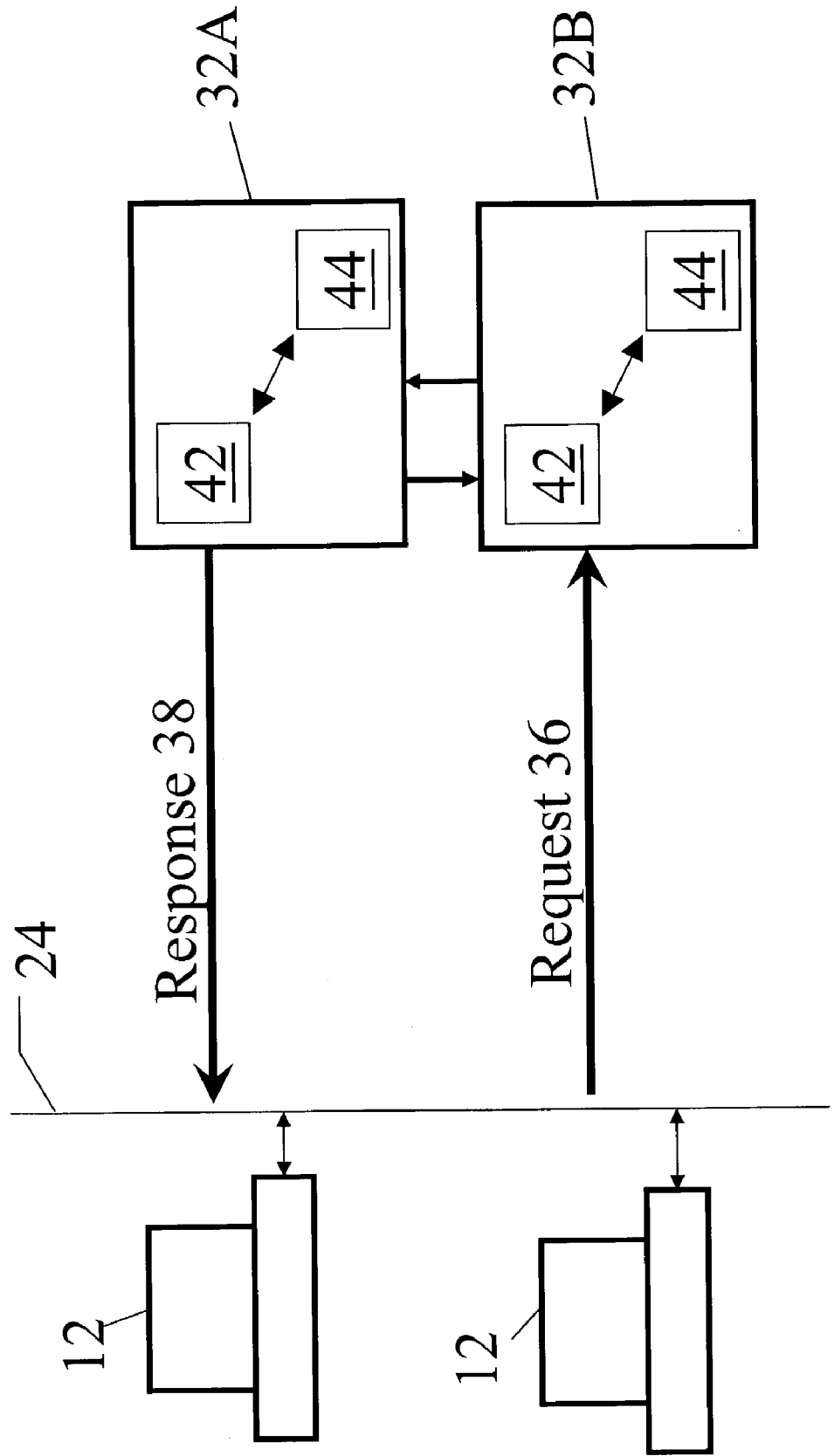
FIG. 3 presents in more detail the system depicted in FIG. 2.

Each server 32 may maintain its own storage resources or, as further shown in FIG. 3, may have a storage device 44 coupled to a dedicated server unit 42. The storage device 44 may be a RAID system, a tape library system, a disk array, or any other device suitable for providing storage resources for the clients 12 over LAN 24.

It will be understood that those of ordinary skill in the art that the systems and methods of the invention are not limited to storage area network applications and may be applied to other applications where it may be more efficient for a first server to receive a request and a second server to generate and send a response to that request. Other applications may include distributed file systems, database applications, application service provider applications, or any other application that may benefit from this short-cut response technique.

Figure 4:
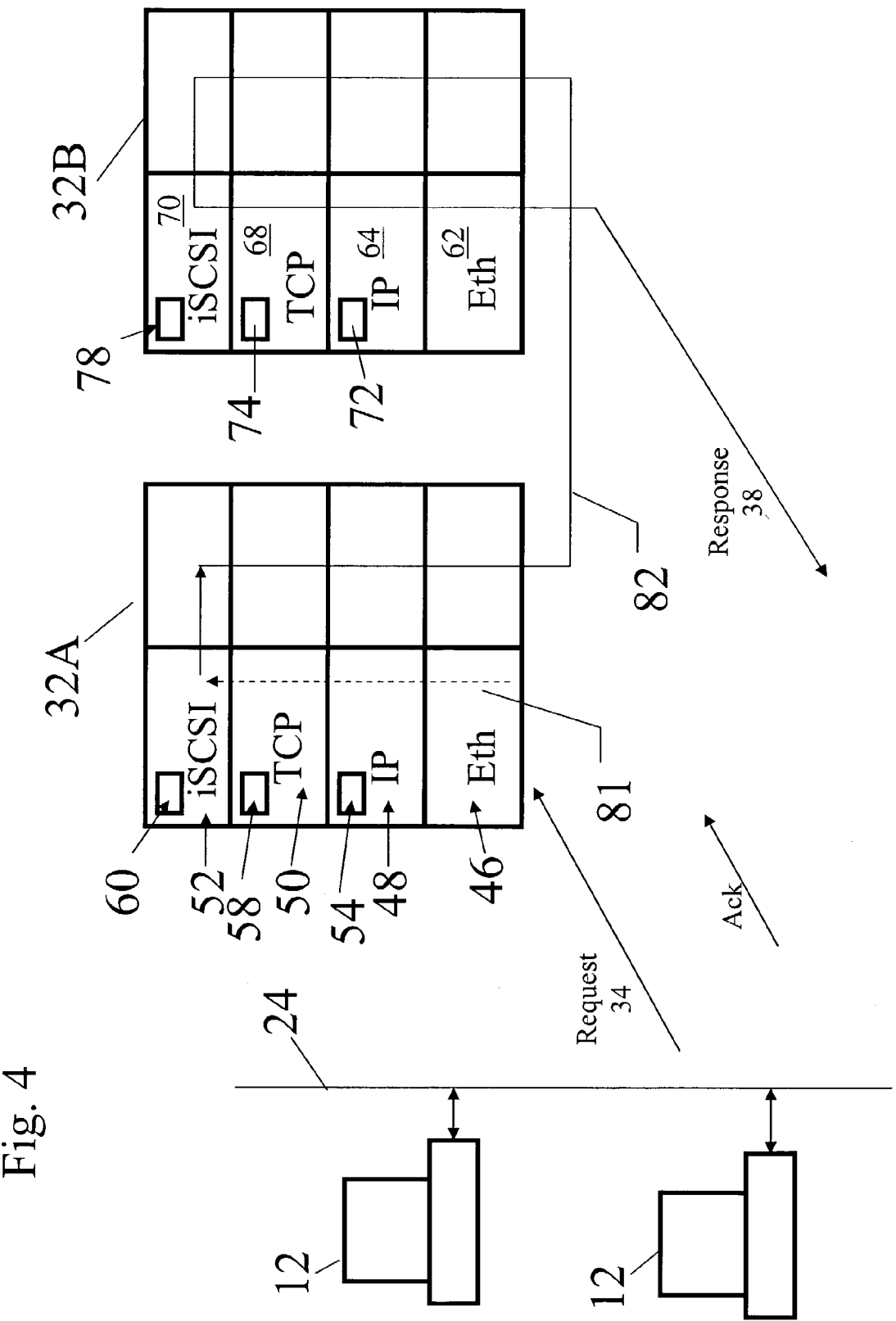
FIG. 4 depicts the flow of data through layers of a network.
Figure 5:
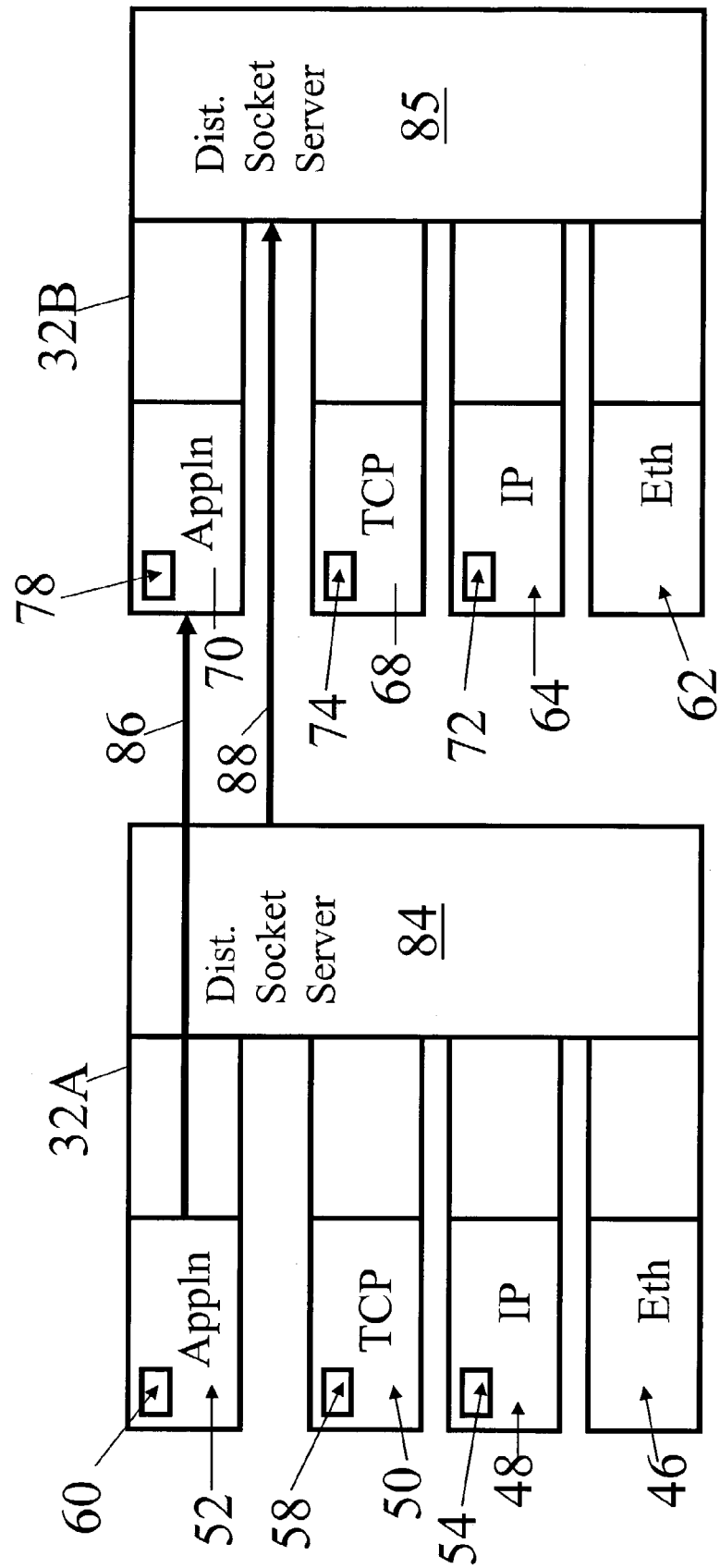
FIG. 5 depicts in more detail one embodiment of a system according to the invention.

FIGS. 4 and 5 depict in more detail one embodiment of a short-cut response suitable for use with the system depicted in FIG. 2. Specifically, FIG. 4 depicts a functional block diagram that shows one example of how connection and state information is created during a short-cut response operation. As will be discussed in more detail hereinafter, when a client 12 and a server 32 exchange information, a connection is established between the client and the server. For each established connection, the server 32 maintains some information about the connection that the server will employ when responding to the client 12. In a traditional client/server exchange, the server that received the client request also responds to the client request. In these cases then, the server that is responding to the request is also the server that set up the connection to the client 12. Thus, all of the connection information is available at the server when the server needs that information to make its response.

Under the short-cut response process described herein, the server generating and transmitting the response may be different from the server that received the request 34 and set up the connection. Accordingly, the server generating the response 38 may need to access the connection information residing on the receiving server in order to be able to directly respond to the client 12. This situation is depicted at a high level in FIG. 3 and explained in detail below.

On example of a short-cut response is depicted in FIG. 4. Specifically, FIG. 4 depicts two servers 32A and 32B that take part in a short-cut response to a request 34 transmitted from one of the clients 12. In this embodiment, the receiving server is server 32A and the responding server is server 32B. The short-cut response technique described herein allows the request 34 to be received by receiving server 32A. The receiving server 32A may determine that server 32B is actually responsible for the resource that has been identified in the request 34. Accordingly, the receiving server 32A may forward the request 34 to the responding server 32B. The responding server 32B may determine the appropriate response to the request 34. The responding server 32B may then prepare a response 38 that may be transmitted directly to the client 12. However, as discussed above, to generate the response 38, the responding server 32B accesses connection information generated by the receiving server 32A in response to the request 34 transmitted by the client.

As depicted in FIG. 4, when the client request 34 is received by the receiving server 32A, the client request may be handled by a plurality of network layers including the data link layer 46. (Typically, the physical layer employs an Ethernet adapter card and the Ethernet protocol; however, the physical layer implementation may vary according to the application.) Thus, further shown in FIG. 4, the request 34 may be processed by the data link layer 46, network layer 48, and transport layer 50 that (in the depicted embodiment) comprise an Ethernet protocol processing layer, Internet Protocol (IP) processing layer, and a Transmission Control Protocol (TCP) transport layer, respectively.

As further shown in FIG. 4, both at the IP layer and the TCP layer connection information 54 and 58 respectively is established. This information can include information representative of the IP address of the client 12 that generated request 34 and to which the response 38 is to be forwarded. It may also include TCP and/or iSCSI sequence numbers, which may also be used to identify the client in some embodiments.

At the TCP layer, connection information 58 may be established that includes information such as the number of datagrams or packets received or other kinds of similar information.

After the TCP layer 50, the request 34 may travel to the application layer (i.e., the "upper layers" in the OSI model) 52. In the depicted embodiment, the application layer is the Internet Small Computer System Interface (iSCSI) protocol that may be employed as part of the storage area network. At the application layer, connection information 60 may be stored where this connection information is representative of application level connection information that is relevant to the proper functioning of the iSCSI application program. In addition to connection information, it will also be understood that state information, such as HTTP cookies, TCP and/or iSCSI sequence numbers, and other similar information may be maintained and stored.

In either case, it will be seen that at different levels of the network protocol information is generated that is relevant to generating a response to the client 12. In the shortcut response process described herein, the connection and state information maintained at the different layers 54, 58 and 60 of the protocol stack are shared with the responding server 32B. As shown in FIG. 4, the server 32B has a similarly established protocol stack. The protocol stack includes a data link layer 62, a network layer 64, a transport layer 68, and an application layer 70. Similar to receiving server 32A, in responding server 32B each of the layers 64, 68 and 70 provides for storing connection or state information, such as the depicted connection and state information shown by the functional blocks 72, 74, and 78 respectively.

In responding to the request 34, the receiving server 32A has the request 34 travel up through the protocol stack, passing through each layer, as denoted by dashed line 81. As is known to those of ordinary skill in the art, as the request 34 travels through the protocol stack, each layer processes the request, unpacking information, reviewing header information in the request, and performing other functions including setting up and updating connection information that may be employed when responding to the request 34.

As further shown in FIG. 4, at the highest layer 52, the iSCSI protocol may determine that the server 32B is actually responsible for the resource requested by the client 12. Accordingly, in this application the iSCSI application program may forward the client's request to the server 32B, as depicted by solid line 82. The application layer 52 forwards the client request to the application layer 70 of the server 32B that is in control of the resource requested by the client 12. To this end, the server 32A may include a distributed socket server that is capable of providing access to the connection data 54, 58 and 60 maintained at the server 32A. As depicted in FIG. 4, the result of the distributed socket server is to provide the server 32B with access to this connection and state information as if the request 34 had been received and routed through the network stack of server 32B. As shown by path 82 in FIG. 4, the distributed socket server achieves an effect as if the request 34 had been routed from server 32A to server 32B. Consequently, the server 32B has the necessary connection and state information to generate the response 38 for the client 12.

Turning to FIG. 5, one embodiment of a distributed socket server is depicted. Specifically, FIG. 5 depicts the equivalent servers 32A and 32B. Server 32A has a plurality of layers in the protocol stack that include layers 46, 48, 50 and 52. Alongside the layers is shown the distributed socket server 84. Similarly, the server 32B is shown as having a plurality of layers in the protocol stack including layers 62, 64, 68 and 70. Server 32B has a distributed socket server process 85 that is shown as being in communication with each of the layers of the protocol stack. Also depicted in FIG. 5 is an example of a data exchange between the application layer 52 of server 32A and the application layer 70 of server 32B, as well as a data exchange between socket server 84 of server 32A and socket server 85 of server 32B.

As shown in FIG. 5, the distributed socket server 84 may work with a socket established by the application 52. In one embodiment, the application 52 receives the request 34 (not shown) from the client and determines that server 32A is not the server responsible for the resource requested by the client. The server 32A then determines or identifies the server on the network that is responsible for the requested resource. Application 52 determines that server 32B is responsible for the requested resource. The application 52 then forwards the request, at the application level, to the application 70 operating on server 32B. The forwarding of the request is depicted by the communication 86 shown on FIG. 5. The application 70 receives the forwarded request and processes that request.

Upon processing the request, the server 32B determines that the connection and state information for generating the response (not shown) is stored at server 32A. Accordingly, the application 70 can direct the socket server 85 to request connection and state information from the socket server 84. The socket server 84 is in communication with each layer 46, 48, 50, and 52 of the protocol stack. Accordingly, the socket server 84 can gather the appropriate connection and state information from the different layers of the protocol stack and transfer the collected connection and state information to the socket server 85 via communication 88. The socket server 85 can store or establish the appropriate information at the appropriate protocol layers 64, 68 and 70. After server 32B generates the response, its socket server 85 sends any necessary changes in the connection state back to socket server 84 in server 32A. Accordingly, the distributed socket server 85 configures the server 32B to generate the response 38 (not shown).

Figure 6:
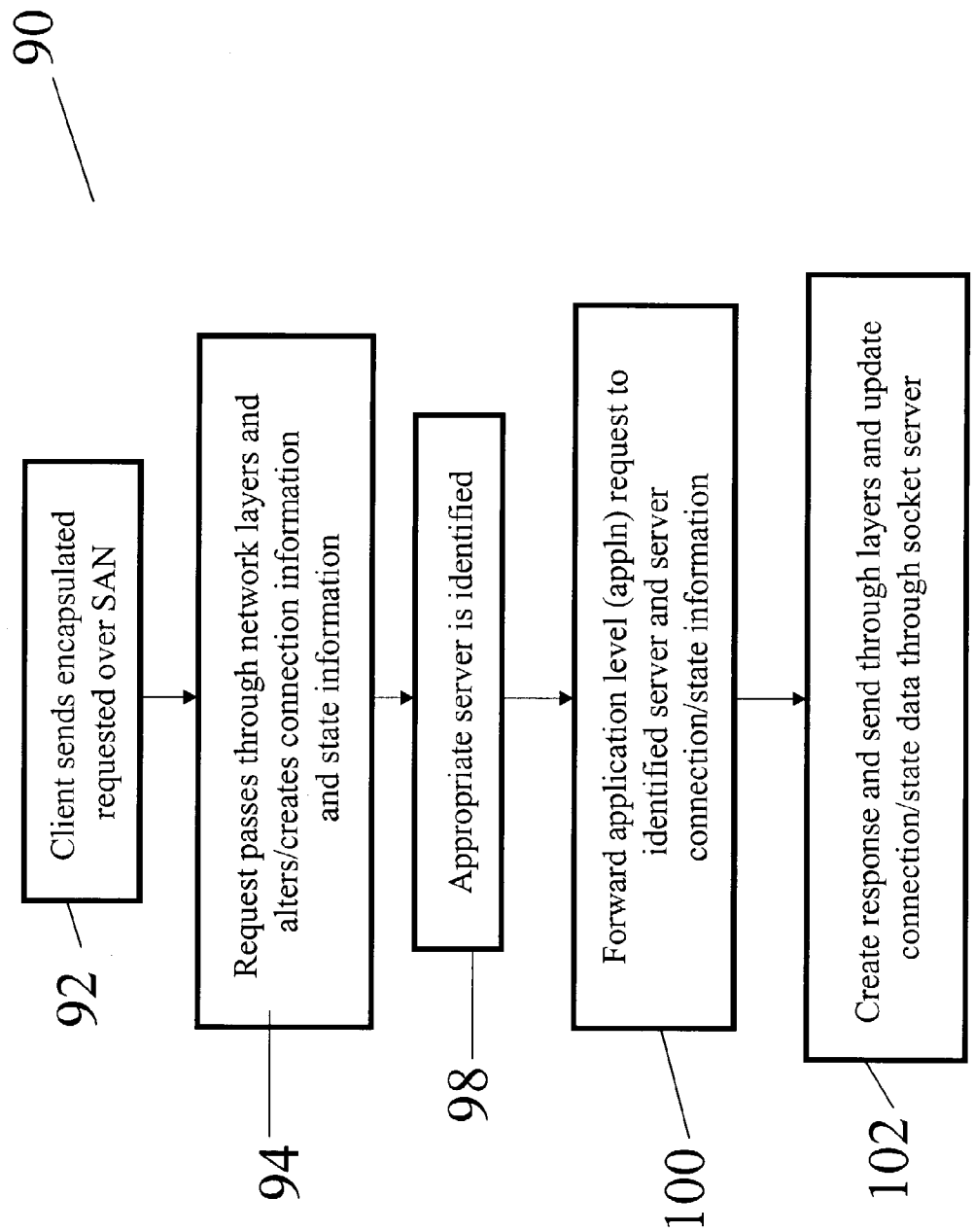
FIG. 6 presents a flow chart diagram of one process according to the invention.

Turning to FIG. 6, one process for short-cut response is shown as a flow chart diagram. Specifically, FIG. 6 depicts one process 90 that begins in a step 92 when a client such as one of the depicted clients 12 sends an encapsulated request to the storage area network (SAN). After step 92, the process 90 proceeds to step 94 wherein the request passes through the protocol stack of the server to which the client directed the request. The request, while passing through the protocol stack, alters and creates connection information and state information related to this request. At block 98, the process 90 determines the appropriate server for responding to the request generated by the client 12. In those cases where the responding server is different from the server that received the request, the process 90 may forward (or otherwise route or redirect) the request to the identified responding server.

At block 100, the responding server can process the forwarded request to determine the server that has the connection and state information necessary for generating the short-cut response (i.e., the receiving server). In an alternative practice, the forwarded request may also contain the connection state information necessary for having the identified responding server, such as server 32B, generate the appropriate response for the client. In either case, the server that has been identified as being responsible for the resource requested by the client now has the request from the client as well as the connection state information necessary to respond to that request. In block 102 the responding server can create the response through the layers of the protocol stack on that server and to the client. The distributed socket server can then update the connection and state information on the appropriate server and in the process may terminate.

The above description, with reference to FIGS. 1 through 6, discloses a short-cut response system and method, that is one embodiment, employs a distributed socket server that executes as a process on each of the servers in the network 30. As shown, the short-cut response methods disclosed herein may be employed as part of a client/server system where the server that receives a client request may be different from the server that responds to the request. These methods have been described with reference to a SAN application, but this is only for the purpose of clarity and the methods disclosed herein are suitable for use in a wide variety of applications.

Moreover, the depicted system and methods may be constructed from conventional hardware systems and specially developed hardware is not necessary. For example, the depicted server group 30, the client systems 12 can be any suitable computer system such as a PC workstation, a handheld computing device, a wireless communication device, or any other such device equipped with a network client capable of accessing a network server and interacting with the server to exchange information with the server. Optionally, the client and the server can rely on an unsecured communication path for accessing services on the remote server. To add security to such a communication path, the client and the server can employ a security system, such as any of the conventional security systems that have been developed to provide to the remote user a secured channel for transmitting data over the Internet. The servers may be supported by a commercially available server platform such as a Sun Sparc™ system running a version of the Unix operating system and running a server capable of connecting with, or exchanging data with, one of the clients 12.

As discussed above, the short-cut response mechanism can be realized as a software component operating on a conventional data processing system such as a UNIX workstation. In that embodiment, the short-cut response mechanism can be implemented as a C language computer program, or a computer program written in any high level language including C++, C Pascal, FORTRAN, Java, or basic. Additionally, in an embodiment where microcontrollers or DSPs are employed, the short-cut response mechanism can be realized as a computer program written in microcode or written in a high level language and compiled down to microcode that can be executed on the platform employed. The development of such code is known to those of skill in the art, and such techniques are set forth in Digital Signal Processing Applications with the TMS320 Family, Volumes I, II, and III, Texas Instruments (1990). Additionally, general techniques for high level programming are known, and set forth in, for example, Stephen G. Kochan, *Programming in C*, Hayden Publishing (1983).

Those skilled in the art will know or be able to ascertain using no more than routine experimentation, many equivalents to the embodiments and practices described herein.

Accordingly, it will be understood that the invention is not to be limited to the embodiments disclosed herein, but is to be understood from the following claims, which are to be interpreted as broadly as allowed under the law.

We claim:

1. A method for providing distributed services over a data network, comprising:
    detecting at a first server a request from a client for access to a resource and establishing a connection for communicating between the first sever and the client, said connection having state information,
    identifying at the first server, which of a plurality of servers, including the first server and a second server, to respond to the detected request;
    in an event that the second server is identifying as being responsible for the resource requested, communicating to the second server the state information, and allowing the second server to create and transmit a response directly to the client without having the first server forwarding the response and without establishing a separate connection for communicating with the client, instead sharing with the first server the same connection between the first server and the client, while maintaining at the first server the connection between the first server and the client,
    updating the state information at the second server, and
    transmitting the updated state information from the second server to the first server.

2. The method of claim 1, further comprising storing the state information in memory.

3. The method of claim 1, wherein the communication connection follows a communication protocol selected from the group consisting of FTP, iSCSI, NFS, CIFS.

4. The method of claim 1, wherein the state information includes information selected from the group consisting if IP addresses, TCP sequence numbers, and iSCSI sequence numbers.

5. A system for providing distributed services over a data network, comprising:
   a first server connecting to the data network and detecting a request from a client for access to a resource, the first server establishing a communication connection with the client, the connection having state information, the first server identifying which one or more servers of a plurality of servers, including the first server is responsible for the resource requested;
   A second server associated with the requested resource, and
   a socket server for following distributed access to state information associated with the communication connection to allow the second server to create and transmit a response directly to the client without having the first server forwarding the response and without establishing a separate communication connection with the client, instead sharing with the first server the same connection between the first server and the client, while maintaining at the first server the communication connection between the first server and the client, and allow transmission of updated state information from the second server tot the first server.

6. The system of claim 5, wherein the first server includes a listening thread for detecting requests from a client.

7. The system of claim of 6, wherein the listening thread detects request from a client for access to distributed service.

8. The system of claim 5, wherein the communication connection follows a communication protocol selected from the group consisting of FTP, iSCSI, NFS, CIFS.

9. The system of claim of 5, wherein the state information includes information selected from the group consisting of IP addresses, TCP sequence numbers, and iSCSI sequence number.

10. A computer readable medium having stored thereon programming instructions to enable a computer when executing the programming instructions to:
   detect at a first server from a client for access to resource and establish a connection for communication between the first server and the client, said connection having state information,
   identify at the first server, which of a plurality of servers, including the first sever and a second server, to respond to the detected request;
   in an event that the second server is identified as being responsible for the resource requested, communicate to the second server the state information and allow the second server to create and transmit a response directly to the client without having the first server forwarding the response and without establishing a separate connection for communicating with the client, instead sharing with the first server the same connection between the first server and the client, while maintaining at the first server the connection between the first server and the client,
   update the state information at the second server, and
   transmit the updated state information from second server to the first server updated the state information.

11. The method of claim 1, wherein the second server is identified by the first server.

* * * * *

UNITED STATES PATENT AND TRADEMARK OFFICE
CERTIFICATE OF CORRECTION

PATENT NO. : 7,627,650 B2
APPLICATION NO. : 10/347901
DATED : December 1, 2009
INVENTOR(S) : G. Paul Koning et al.

It is certified that error appears in the above-identified patent and that said Letters Patent is hereby corrected as shown below:

Column 8, Claim 1, Line 43
delete "sever" and insert --server--;

Column 8, Claim 1, Line 48
delete "identifying" and insert --identified--;

Column 9, Claim 4, Line 2
delete "if" and insert --of--;

Column 9, Claim 5, Line 7
delete "connecting" and insert --connected--;

Column 9, Claim 5, Line 16
delete "following" and insert --allowing--;

Column 9, Claim 5, Line 25
insert --to-- between "and allow";

Column 9, Claim 5, Line 27
delete "tot" and insert --to--;

Column 9, Claim 7, Line 31
delete "request" and insert --requests--;

Column 10, Claim 9, Lines 4-5
delete "number" and insert --numbers--;

Column 10, Claim 10, Line 8
insert --a request-- between "server from";

Column 10, Claim 10, Line 13
delete "sever" and insert --server--;

CERTIFICATE OF CORRECTION (continued)
U.S. Pat. No. 7,627,650 B2

Column 10, Claim 10, Line 28
delete "updated" and insert --update--.

Signed and Sealed this

Thirteenth Day of April, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,627,650 B2 |
| APPLICATION NO. | : 10/347901 |
| DATED | : December 1, 2009 |
| INVENTOR(S) | : Koning et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 881 days.

Signed and Sealed this

Second Day of November, 2010

David J. Kappos
*Director of the United States Patent and Trademark Office*